United States Patent [19]
Takahashi

[11] Patent Number: 4,620,715
[45] Date of Patent: Nov. 4, 1986

[54] STEERING APPARATUS FOR VEHICLE
[75] Inventor: Hirotake Takahashi, Saitama, Japan
[73] Assignee: Honda Giken Kogyo Kabushiki Kaisha, Tokyo, Japan
[21] Appl. No.: 728,776
[22] Filed: Apr. 30, 1985
[30] Foreign Application Priority Data
May 1, 1984 [JP] Japan .................. 59-88125
[51] Int. Cl.$^4$ .................. B62K 5/08; B62D 7/00
[52] U.S. Cl. .................. 280/269; 280/95 R; 74/496; 180/254
[58] Field of Search .................. 280/269, 95 R, 93; 180/210, 215, 254; 74/496

[56] References Cited
U.S. PATENT DOCUMENTS

| 1,292,102 | 1/1919 | Shaw | 280/95 R |
| 2,692,778 | 10/1954 | Stump | 280/95 R |
| 3,073,616 | 1/1963 | Stump | 280/95 R |

FOREIGN PATENT DOCUMENTS 381624  10/1932  United Kingdom .................. 280/95

Primary Examiner—John A. Pekar
Attorney, Agent, or Firm—Lyon & Lyon

[57] ABSTRACT

In a vehicle in which a front swing frame is suspended vertically swingably from the front of a body frame and in which right and left side front wheels are journaled to both right and left sides of the swing frame in a steerable manner, a steering apparatus is coupled to a steering handle for steering operation for the front wheels, having a steering linkage and a steering shaft coupled to the steering handle as well as to the steering linkage through a lower steering joint, the center of the lower steering joint being disposed on a longitudinal axis of pivot shafts which support the swing frame on the body frame.

5 Claims, 7 Drawing Figures

STEERING APPARATUS FOR VEHICLE

BACKGROUND OF THE INVENTION

1. Field of the Invention:

This invention relates to an apparatus for steering front right and left wheels of a vehicle in which a front swing frame is journaled vertically swingably at the front of a body frame and the front right and left wheels are journaled at both sides of the swing frame.

2. Description of the Prior Art:

A four-wheel vehicle shown in FIG. 6 is heretofore known in which a front swing frame 02 suspended through a front cushion 015 at the front of a body frame 01 is journaled at its base about a horizontal axis to the front of the frame 01. Front right and left wheels 03r, 03l are journaled to both sides of the frame 02. The right and left wheels 03r, 03l are operatively connected through a steering apparatus S' with a steering handle 022 provided at the frame 01.

In such a conventional vehicle, a pivotal supporting point $P_1$ of the frame 02 and a central point $P_2$ of rotation of a lower steering joint 025, which couples the steering shaft 024 of the steering apparatus S' to a steering linkage L' provided on the frame 02, are longitudinally displaced. Thus, the shaft 024 must be extendably constructed by using a spline engagement for allowing the frame 02 to swing up and down.

However, if the steering shaft is thus constructed, waterproofing and mudproofing means should be provided in the stretchable portion a of the shaft 024. The provision for these features may result in a large increase of manufacturing costs.

SUMMARY OF THE INVENTION

The present invention has been made with a view to eliminating the above-mentioned disadvantages, and its object is to provide a steering apparatus for a vehicle with a simple structure in which the swingable shaft supporting point or pivot point of a front swing frame and the center of a lower steering joint are brought into coincidence on the same line so that the frame can vertically swing without being affected by the steering apparatus. This enables a steering shaft of a predetermined length to be used.

To achieve the above-mentioned object, according to the characteristic features of the present invention, there is provided a steering apparatus for a vehicle in which a front swing frame suspended to the front of a body frame has its base journaled about a horizontal axis via a pivot shaft to the body frame. Front right and left wheels are respectively journaled at both right and left sides of the swing frame in a steerable manner. A steering linkage is connected to the front right and left wheels and coupled through a lower steering joint to the lower end of a steering shaft connected to a steering handle. In this arrangement the relative position between the pivot shaft and the lower steering joint is set so as to locate the center of the steering joint on a longitudinal axis of the pivot shaft.

With the construction as described above, the steering operation of the steering apparatus and the vertical swinging motions of the front swing frame are executed independently from each other without interference with each other. The foregoing results in the steering shaft of the steering apparatus not needing to be provided with a stretchable section as in the conventional apparatus described above. The maneuverability of the steering apparatus is improved and the vertical swinging motions of the swing frame are performed smoothly and lightly.

Further, the steering shaft can be formed of a rod material of a predetermined length to enhance its rigidity, and it is not necessary to provide dustproofing and waterproofing means at a stretchable section which is required in a conventional apparatus. In this way, the number of components as a whole can be reduced to largely reduce the cost and to reduce the weight of the entire steering apparatus.

In addition to the abovementioned construction, if the lower steering joint is composed of a first joint half fixedly secured to the lower end of the steering shaft and a second joint half with an outer casing, formed integrally with the top of a swing shaft supported to the front swing frame, and if a steering arm coupled with a tie rod connected to the front right and left wheels is extended integrally from the outer periphery of the outer casing, the height of bottom portion of the steering apparatus above ground can be set larger than the conventional apparatus. Thus, the steering apparatus of the invention is particularly effective when applied to a buggy vehicle which travels on an irregular or bumpy ground, snowy ground and the like.

These and other features and advantages will be apparent from the following detailed description of a preferred embodiment in reference to the accompanying drawings.

BRIEF DESCRIPTION OF THE DRAWINGS

The drawings show one embodiment of the present invention, wherein.

DESCRIPTION OF THE PREFERRED EMBODIMENT

One preferred embodiment of the present invention will now be described in detail with reference to FIGS. 1 to 5.

Figure 1:
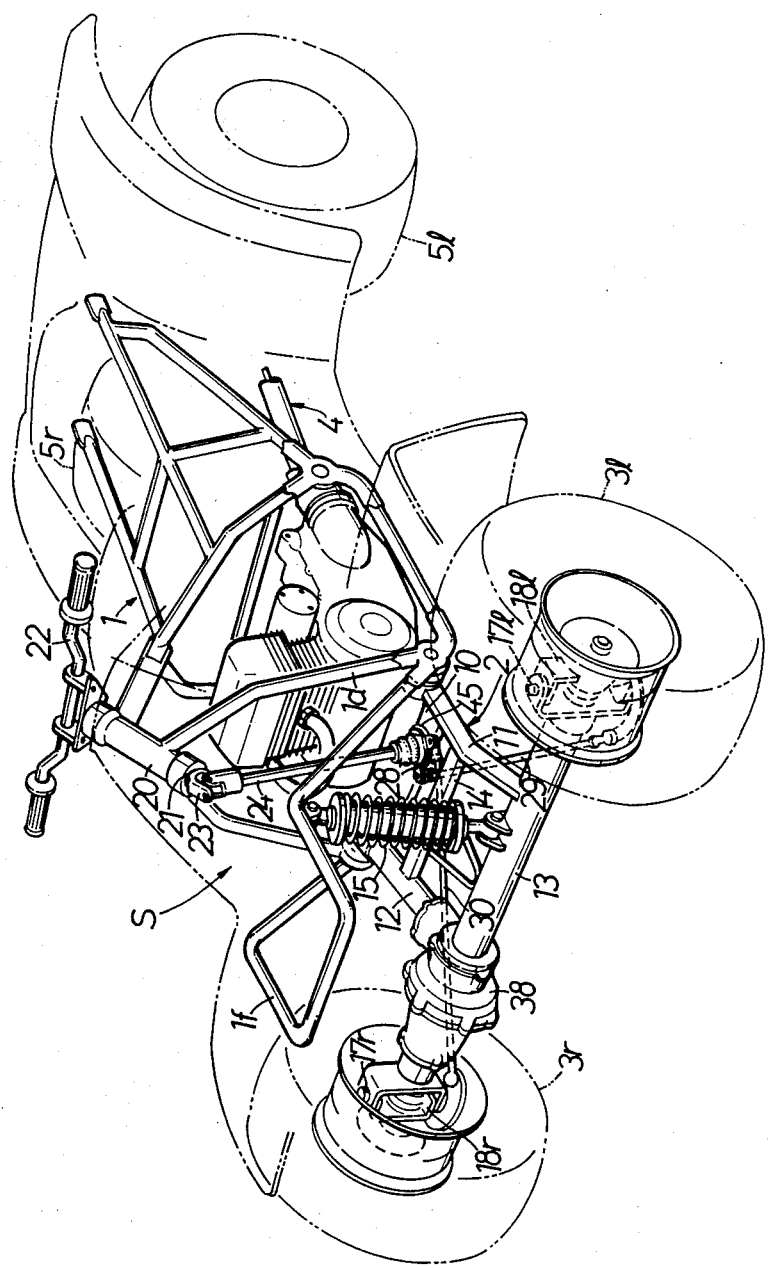
FIG. 1 is a perspective view of a buggy vehicle having a steering apparatus according to the present invention mounted thereon.
Figure 2:
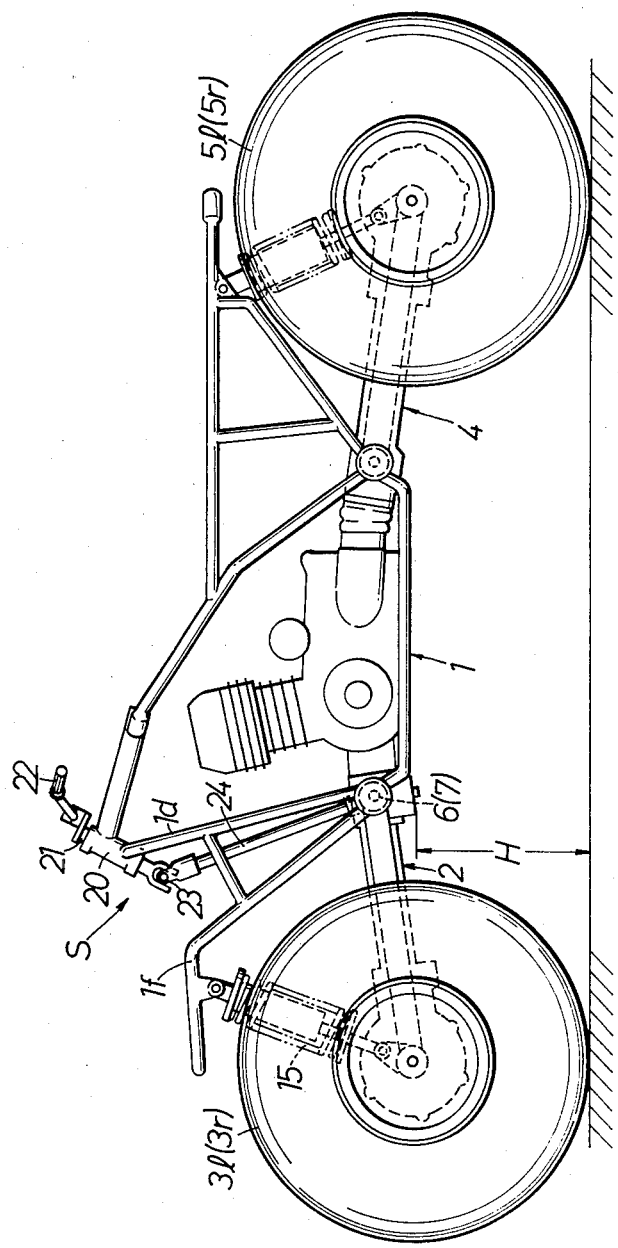
FIG. 2 is a side view of the vehicle.

In FIGS. 1 and 2, a four-wheel vehicle is constructed of a four-wheel drive or full-wheel drive type wherein an occupant can straddle over a body frame 1. A front swing frame 2 is journaled on the front of the frame 1 about a horizontal axis, and front right and left drivable wheels 3r and 3l which can be steered to the right and left directions are respectively journaled to the right and left sides of the swing frame 2. A rear swing frame 4 is swingable about a horizontal axis suspended to the rear of the frame 1, and rear right and left drivable wheels 5r and 5l are journaled to the right and left sides of the frame 4.

In FIGS. 1 to 4, left and right side pivot shafts 6 and 7 formed of short bolts are engaged and fixed, facing inside on the same axial line A—A, to both sides of the bottom of a down tube 1d of the frame 1. The swing frame 2 is vertically swingably journaled through taper roller bearings 8 and 9 to the pivot shafts 6 and 7. The swing frame 2 is composed of a base lateral frame 10 extending along the axial line A—A of the left and right side pivot shafts 6 and 7, left and right side longitudinal frames 11 and 12 extending forwardly from the both ends of the lateral frame 10, a front side lateral frame 13 connected between the front portions of the frames 11 and 12, and a reinforcing cross member 14 for coupling the intermediate portions of the left and right frames 11 and 12.

A front frame 1f is extended forwardly and upwardly from the bottom of the tube 1d of the body frame 1, and a front cushion 15 is coupled between the frame 1f and the lateral frame 13 of the swing frame 2.

U-shaped right and left side wheel supporting arms 16r and 16l are respectively secured fixedly to the right and left side ends of the frame 13 of the swing frame 2, and right and left side knuckles 18r and 18l are respectively secured to the nonrotary portions of right and left side axle and front wheel assemblies 3r and 3l through right and left side king pins 17r and 17l and are respectively coupled to the ends of the arms 16r and 16l in a steerable manner. Arcuate-shaped knuckle arms 19r and 19l are respectively extended integrally from the knuckles 18r and 18l. Tie rods 29 and 30 to be described in greater detail are respectively coupled to the arms 19r and 19l.

A steering apparatus S of the present invention will now be described in detail.

Figure 4:
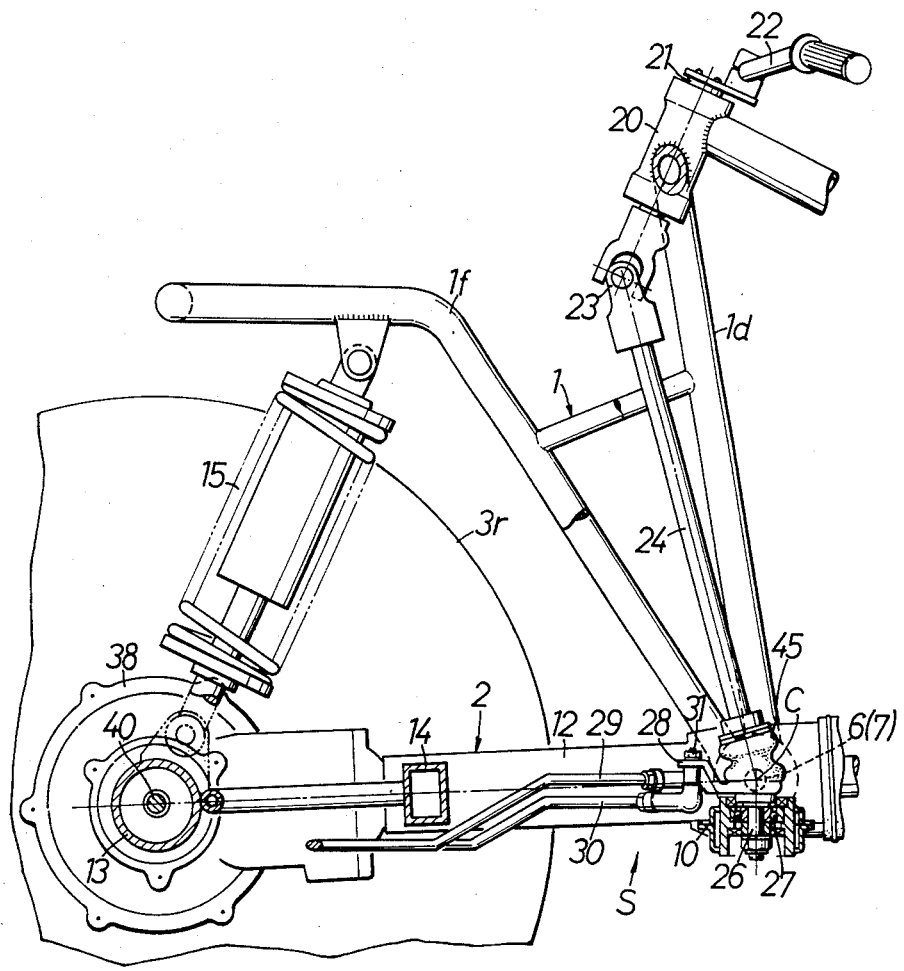
FIG. 4 is a partly cross-sectioned side view of the essential portion of the vehicle.
Figure 5:
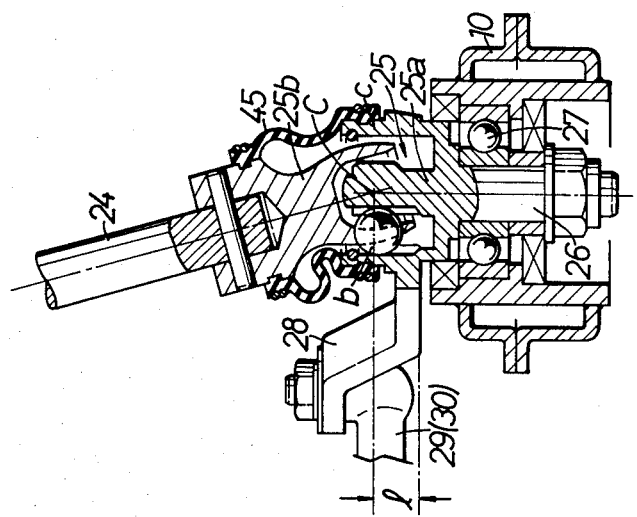
FIG. 5 is a longitudinal cross-sectional view of a pivot portion of a front swing frame.
Figure 6:
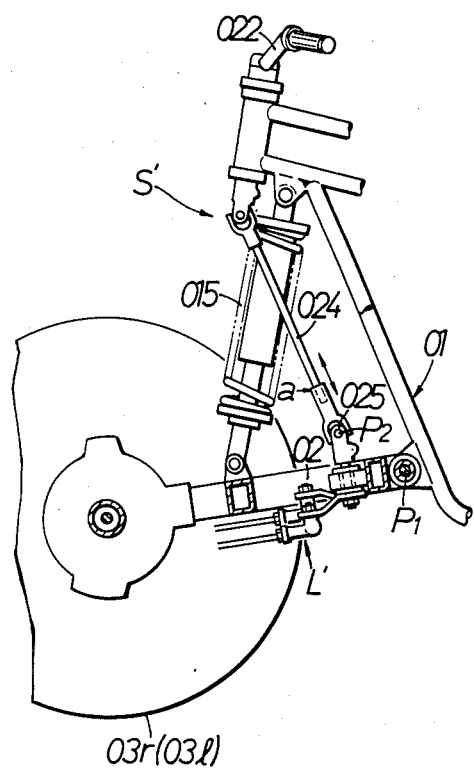
FIG. 6 is a side view of a conventional steering apparatus.

A steering post 21 is rotatably supported to a head pipe 20 of the body frame 1, and a rod-shaped steering handle 22 is secured to the top of the post 21. A steering shaft 24 is coupled through an upper steering joint 23 formed of a universal joint to the bottom of the post 21. The shaft 24 is extended substantially downwardly along the tube 1d, and coupled at its bottom to a substantially vertical swing shaft 26 through a lower steering joint with an outer case such as, for example, a Triball joint 25 (trade name). In FIGS. 4 and 5, the shaft 26 is supported rotatably around a substantially vertical axis via a ball bearing 27 at a laterial central portion of the frame 10. The joint 25 comprises a first joint half 25a provided with an outer casing c formed integrally at the top of shaft 26 as projected upwardly from the upper surface of the frame 10 and a second joint half 25b fixedly secured to the bottom of the shaft 24 and coupled to the first half 25a through balls b in a freely rotatable manner. A flexible boot 45 is coupled between the outer periphery of the outer casing c of the first half 25a and the outer periphery of the second half 25b so that the joint 25 is covered with the boot 45.

The central point C of the joint 25 coincides with the longitudinal axis A—A of the shafts 6 and 7.

A steering arm 28 of bell-crank shape is extended integrally from the outer periphery of the case c of the first half 25a, and the rear ends of the paired tie rods 29 and 30 are pivotally coupled at 31 and 32 to both ends of the arm 28. The pair of tie rods 29 and 30 cross each other and extend forwardly under the front swing frame 2, and are pivotally coupled at the front ends to the ends of the knuckle arms 19r and 19l as at 33 and 34. The arm 28, the pair of tie rods 29 and 30, and the knuckle arms 19r and 19l constitute a steering linkage L.

The operating force of the steering handle 22 rotates the steering shaft 24 through the steering post 21 and the universal joint 23, which in turn swings the arm 28 through the Triball joint 25 around the swing shaft 26 to axially move the pair of left and right side tie rods 29 and 30. Thereby steering of the front left and right side wheels 3r and 3l to the rightward or leftward direction may be accomplished.

Figure 3:
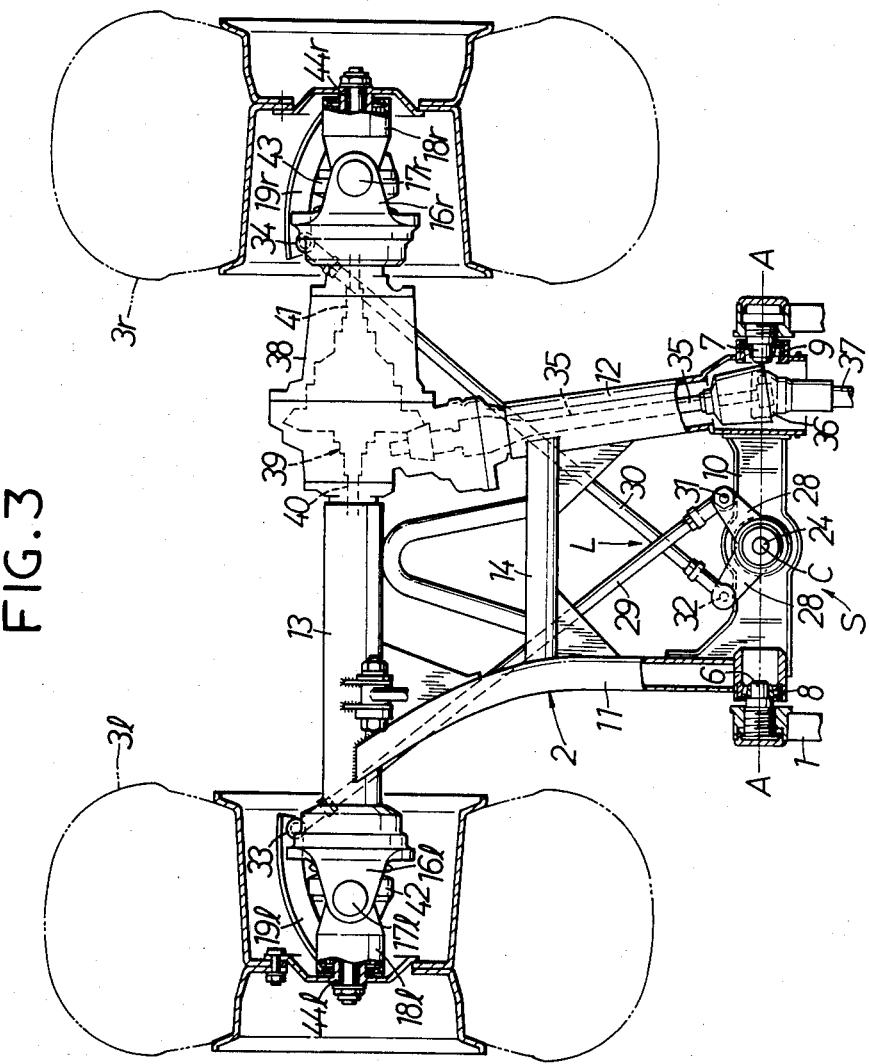
FIG. 3 is a partly cross-sectioned plan view of the essential portion of the vehicle.

As shown in FIG. 3 the right side frame 12 of the swing frame 2 is formed to have a diameter larger than that of the left side frame 11 so as to serve also as a transmission case, through which a propeller shaft 35 longitudinally runs. The shaft 35 is coupled at a rear end thereof through a universal joint 36 to an output shaft 37 leading to an engine (not shown). The shaft 35 is coupled at the front to the input side of a conventional differential device 39, housed in a differential case 38 formed at the front of the frame 12. Left and right side transmission shafts 40 and 41 are extended to the left and right from the output side of the device 39 while passing through the lateral frame 13 and are respectively coupled via constant velocity joints 42 and 43 to the hubs 44l and 44r of the left and right side wheels 3l and 3r. Therefore, when the engine is driven, the propeller shaft 35 is driven through the output shaft 37 and the universal joint 36, the rotation of the shaft 35 is transmitted through the device 39 to the left and right side transmission shafts 40 and 41, and the left and right side front wheels 3l and 3r are driven through the joints 42 and 43.

The operation of the embodiment of the present invention will now be described in detail.

When the vehicle travels, the frame 2 swings vertically around the left and right side pivot shafts 6 and 7 while expanding and contracting the front cushion 15, causing the right and left side front wheels 3r and 3l to travel on the road surface.

When the steering handle 22 is operated to steer the vehicle, the operating force rotates the steering shaft 24 through the steering post 21 and the universal joint 23, further rotates the swing shaft 26 through the Triball joint 25, rocks the steering arm 28 integral with the shaft 26 to axially move the pair of tie rods 29 and 30, thereby steering the left and right side front wheels 3l and 3r to the rightward or leftward direction around the king pins 17l and 17r through the knuckle arms 19l and 19r and the knuckles 18l and 18r.

Since the central point C of the lower steering joint 25 coincides with the longitudinal axis A—A of the left and right side pivot shafts 6 and 7 which swingably journal the swing frame 2, the force caused from up and down swing motions of the frame 2 does not act on the steering system including the steering shaft 24.

Figure 7:
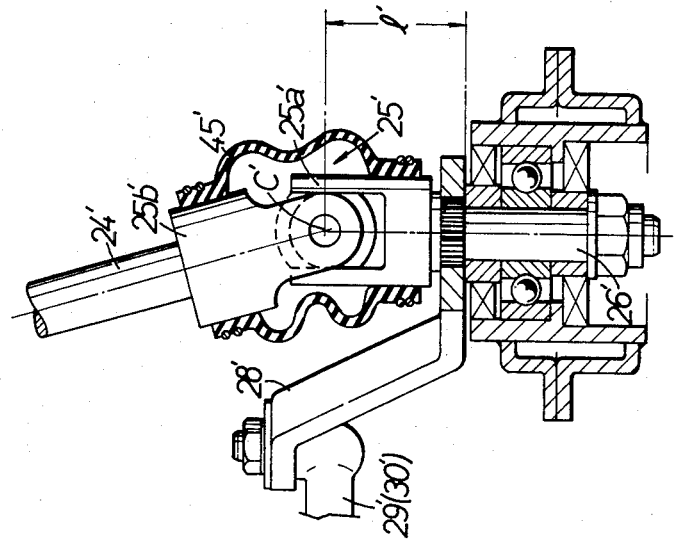
FIG. 7 is a longitudinal cross-sectional view of a supporting shaft of a conventional steering apparatus corresponding to that of FIG. 4.

The arrangement of the steering apparatus of the present invention constructed as described above has such an advantage that the height of the bottom of the steering apparatus S above ground can be set larger than that of conventional steering apparatuses. In order to readily understand the advantage, the structure of one conventional steering apparatus will now be described with reference to FIG. 7. In this conventional steering apparatus, the bottom of the steering shaft 24' is coupled through a normal universal joint 25' to a swing shaft 26', and the outer periphery of the joint 25' is covered with a flexible boot 45'. In this case, since the halves 25a' and 25b' of the joint 25' are opened largely at their sides, the boot 45' is required to be long for covering the joint 25'. Further, since a steering arm 28' for coupling tie rods 29' and 30' is connected to the shaft 26' at a position under the boot 45', distance l' from the center C' of the universal joint 25' to the lower surfaces of the tie rods 29' and 30' or of the arm 28' becomes relatively long. On the contrary, in the embodiment of the invention described above, a steering joint is employed having an outer casing c, such as a Triball joint 25, and the first joint half 25a equipped with the outer casing c is formed integrally with the top of the swing shaft 26 so that the boot 45 can be coupled shallowly to the outer periphery of the outer casing c. Further, since the steering arm 28 for coupling the tie rods 29 and 30 is extended integrally from the casing c, the distance l from the center C of the joint 25 to the lower surface of the tie rods 29 and 30 can be made shorter than that l' of the conventional apparatus. This can increase the height H of the bottom of the steering apparatus above ground.

What is claimed is:

1. In a vehicle having a body frame, a front swing frame suspended from a front of the body frame, and right and left side front wheels journaled to both right and left sides of the swing frame, said swing frame having a base journaled for vertically swinging motion to the body frame via pivot shafts, a steering apparatus comprising a steering linkage coupled to the right and left side front wheels for steering those wheels, a steering shaft leading to a steering handle, and a lower steering joint coupling said steering linkage to a lower end of said steering shaft, wherein a relative position between said pivot shafts and said lower steering joint is set so that a center of said lower steering joint is positioned on a longitudinal axis of said pivot shafts.

2. A steering apparatus as claimed in claim 1, wherein said steering shaft is formed of a rod material having a predetermined length.

3. In a vehicle having a body frame, a front swing frame suspended from a front of the body frame, and right and left side front wheels journaled to both right and left sides of the swing frame, said swing frame having a base journaled for vertically swinging motion to the body frame via pivot shafts, a steering apparatus comprising a steering linkage coupled to the right and left side front wheels for steering those wheels, a steering shaft leading to a steering handle, a lower steering joint coupling said steering linkage to a lower end of said steering shaft, tie rods respectively extending to operatively couple with the front ends of the front wheels, a steering arm coupled to rear ends of said tie rods, and a swing shaft supported on said front swing frame, said swing shaft being formed integrally with said steering arm and coupled to said steering shaft through said lower steering joint, wherein a relative position between said pivot shafts and said lower steering joint is set so that a center of said lower steering joint is positioned on a longitudinal axis of said pivot shafts and wherein said lower steering joint comprises a first joint half having an outer casing, formed integrally with a top portion of said swing shaft, and a second joint half secured to the lower end of said steering shaft and coupled rotatably to said first joint half, said steering arm coupled to said tie rods being extended integrally from an outer periphery of said outer casing.

4. A steering apparatus for a vehicle having a body frame, a front swing frame suspended from a front of the body frame and right and left side front wheels journaled to both right and left sides of the swing frame, the swing frame having a base journaled for vertically swinging motion to the body frame via pivot shafts, comprising a steering linkage coupled to the right and left side front wheels for steering those wheels, a steering shaft, a lower steering joint coupling said steering linkage to a lower end of said steering shaft, a steering arm coupled to said steering linkage and a swing shaft supported on the front swing frame, said swing shaft being formed integrally with said steering arm and coupled to said steering shaft through said lower steering joint, said lower steering joint including a first joint half having an outer casing integral with a top portion of said swing shaft, and a second joint half secured to the lower end of said steering shaft and coupled rotatably to said first joint half, said steering arm being extended integrally from an outer periphery of said outer casing.

5. The steering apparatus of claim 4 wherein a relative position between said pivot shafts and said lower steering joint is set so that a center of said lower steering joint is positioned on a longitudinal axis of said pivot shafts.

* * * * *